(12) United States Patent
Kinkade

(10) Patent No.: US 11,804,022 B1
(45) Date of Patent: Oct. 31, 2023

(54) SYSTEMS AND METHODS FOR GENERATIVE DRAWING AND CUSTOMIZATION OF THREE-DIMENSIONAL ("3D") OBJECTS IN 3D SPACE USING GESTURES

(71) Applicant: Illuscio, Inc., Culver City, CA (US)

(72) Inventor: Kyle Kinkade, Mountlake Terrace, WA (US)

(73) Assignee: Illuscio, Inc., Culver City, CA (US)

( * ) Notice: Subject to any disclaimer, the term of this patent is extended or adjusted under 35 U.S.C. 154(b) by 0 days.

(21) Appl. No.: 18/183,712

(22) Filed: Mar. 14, 2023

(51) Int. Cl.
*G06T 19/20* (2011.01)
*G06F 3/01* (2006.01)

(52) U.S. Cl.
CPC .............. *G06T 19/20* (2013.01); *G06F 3/011* (2013.01); *G06F 3/017* (2013.01); *G06T 2200/24* (2013.01); *G06T 2219/2004* (2013.01); *G06T 2219/2021* (2013.01)

(58) Field of Classification Search
None
See application file for complete search history.

(56) References Cited

U.S. PATENT DOCUMENTS

| | | | | |
|---|---|---|---|---|
| 2004/0263512 | A1* | 12/2004 | Santodomingo | G06T 17/00 345/428 |
| 2013/0181987 | A1* | 7/2013 | Fowler | G06F 3/048 345/420 |
| 2013/0325744 | A1* | 12/2013 | Sinai | G06Q 50/01 705/345 |
| 2014/0344731 | A1* | 11/2014 | Holz | G06F 3/04812 715/764 |
| 2017/0228130 | A1* | 8/2017 | Palmaro | G06F 3/0485 |
| 2022/0070513 | A1* | 3/2022 | Shirai | H04N 21/4312 |

* cited by examiner

*Primary Examiner* — Kyle Zhai
(74) *Attorney, Agent, or Firm* — Ansari Katiraei LLP; Arman Katiraei; Sadiq Ansari

(57) ABSTRACT

Disclosed is a system and associated methods for the generative drawing and customization of three-dimensional ("3D") objects in 3D space using hand gestures. The system adapts the hand gestures as intuitive controls for rapidly creating and customizing the 3D objects to have a desired artistic effect or a desired look. The system selects a 3D model of a particular object in response to a first user input, sets a position in a virtual space at which to generate the particular object in response to a mapped position of a first hand gesture tracked in a physical space, and generates a first state representation of the particular object at the position in the virtual space in response to a second hand gesture. The first state representation presents the particular object at one of different modeled stages of the particular object lifecycle.

20 Claims, 8 Drawing Sheets

SYSTEMS AND METHODS FOR GENERATIVE DRAWING AND CUSTOMIZATION OF THREE-DIMENSIONAL ("3D") OBJECTS IN 3D SPACE USING GESTURES

BACKGROUND

Creating a three-dimensional ("3D") object is a time-consuming and complex task with existing creative tools. For instance, an artist constructs a mesh or polygonal model of the 3D object before applying textures and colors to define the visual characteristics of that model. These operations are extraordinarily time consuming as each mesh or polygon is separately defined and added to the model.

Artists may instead rely on predefined models. The predefined model of the desired 3D object is selected, positioned into the scene, and customized using myriad of input fields and configurable parameters or by individualized selection and editing of different meshes, polygons, or other constructs of the model using a keyboard, mouse, digitizer tablet, and/or other two-dimensional ("2D") input devices.

These tools and techniques for creating a 3D scene remain time and labor intensive. Moreover, these tools and techniques are not intuitive because they require a high-level of technical training in order to create and define the 3D objects of the scene with desired artistic effects or with a desired look even when the models are predefined.

DETAILED DESCRIPTION OF PREFERRED EMBODIMENTS

The following detailed description refers to the accompanying drawings. The same reference numbers in different drawings may identify the same or similar elements.

Provided are systems and methods for generative drawing and customization of three-dimensional ("3D") objects in 3D space using gestures. The systems and methods provide intuitive controls for rapidly creating a 3D scene with 3D objects that are customized to have a desired artistic effect or a desired look in response to 3D hand gestures or gestures made based on tracked eye movements.

The systems and methods provide a new 3D generative paradigm that avoids the complexities of mapping 2D inputs to 3D objects and/or the precision required to define, select, and edit individual pixels, meshes, polygons, and/or other constructs of the 3D object in order to achieve the desired artistic effect or look within a 3D scene. The 3D generative paradigm simplifies the creation of customized 3D objects in a 3D scene by eliminating the time and efforts associated with defining each individual mesh, polygon, or other construct of the 3D object, and the time and efforts associated with tuning myriads of customizable input fields or object parameters to alter the form, shape, size, configuration, distribution, and/or other visual properties of the 3D object.

Instead, the 3D generative paradigm created by the systems and methods uses intuitive hand gestures or eye movements for the creation and customization of 3D objects. The hand gestures or eye movements simplify the placement, sizing, shape, and form of the 3D objects in a 3D scene, and also simplify the customization of the 3D objects by altering the visual characteristics of the 3D objects via transitions through different modeled states of the 3D objects using the hand gestures.

Figure 1:
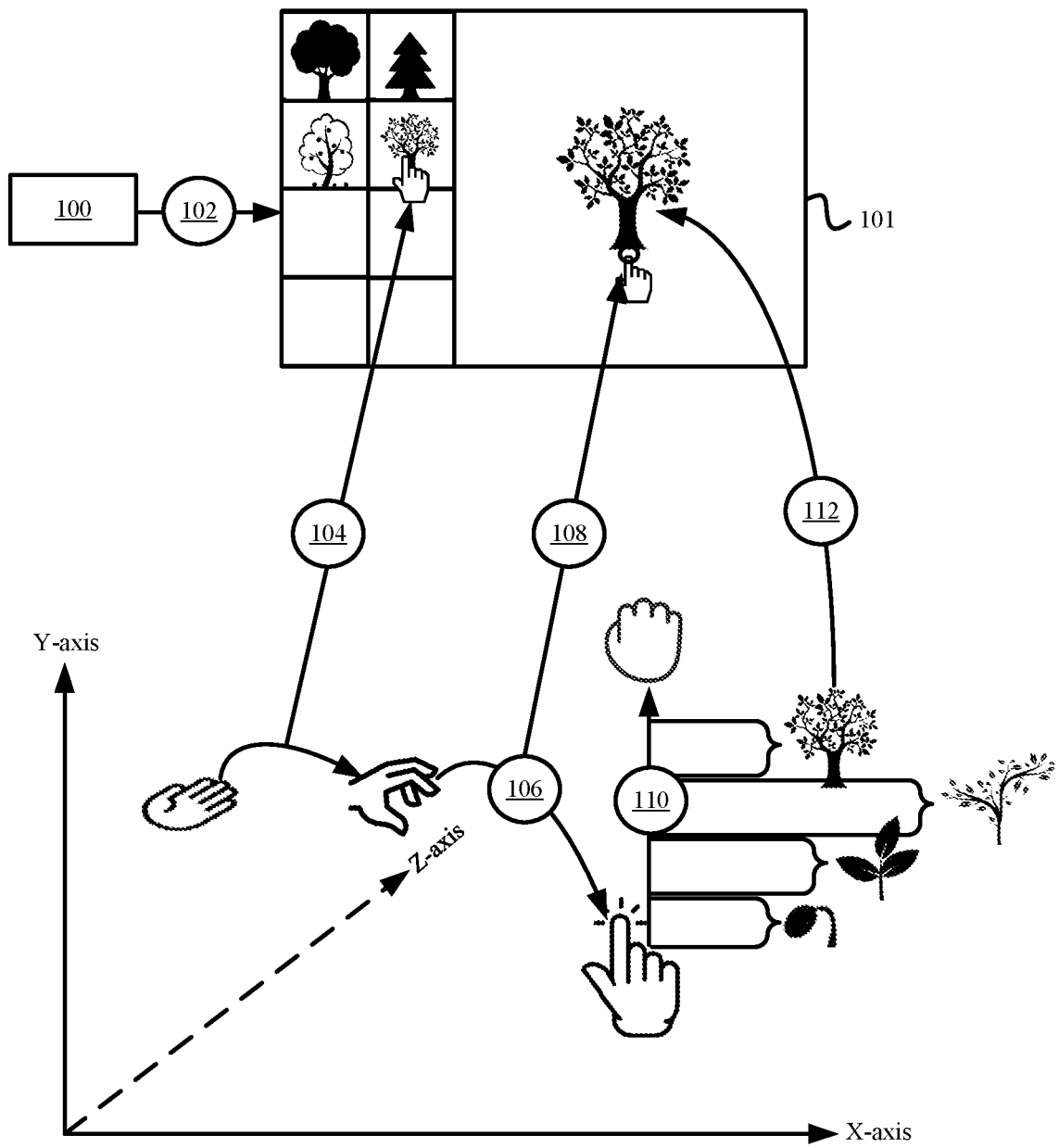
FIG. 1 illustrates an example of the generative drawing of a three-dimensional ("3D") object in a 3D scene using hand gestures in accordance with some embodiments presented herein.

FIG. 1 illustrates an example of generative drawing of a 3D object in a 3D scene using hand gestures in accordance with some embodiments presented herein. 3D generative system 100 provides (at 102) user interface ("UI") 101 for the generative drawing of 3D objects. UI 101 may be displayed in a virtual reality, augmented reality, mixed reality, or other spatial computing headset, or in a display that presents the 3D scene being created by the user.

UI 101 includes a selection window or interface for different 3D objects that may be generatively created in a scene. For instance, UI 101 may include multiple different icons for generating 3D objects of different types of trees, and/or icons for generating 3D objects of different types of objects including trees, plants, grass, cars, buildings, characters, etc.

3D generative system 100 selects (at 104) the icon or UI element from UI 101 for the generative creation of a particular tree in response to a tracked hand gesture. In some embodiments, 3D generative system 100 tracks the user's hand gestures in 3D space using one or more sensors or 3D cameras. In some other embodiments, 3D generative system 100 receives 3D input corresponding to the user's hand movements from one or more 3D controllers that are held in or attached to the user's hands. The 3D controllers include 3D motion sensors (e.g., accelerometers, rotational sensors, gyroscopes, magnetometers, orientation sensors, etc.) that track movement, pitch, roll, yaw, and other 3D positions of the 3D controllers.

3D generative system 100 tracks (at 106) a first hand gesture after the selection (at 104) of the UI element for the particular tree. The first hand gesture corresponds to an intuitive action for planting, rooting, or positioning the base of the tree. For instance, the first hand gesture may include a point, tap, dig, or swipe gesture. 3D generative system 100 tracks (at 106) the position of the first hand gesture in a physical space, and maps the physical space position to a corresponding position in the 3D space of the scene that is being created. 3D generative system 100 sets (at 108) the base position for the 3D object of the particular tree at the mapped position where the first hand gesture is issued.

3D generative system 100 tracks (at 110) a second hand gesture that is performed after the first hand gesture. The second hand gesture is an intuitive hand gesture for raising the particular tree from the defined base position. For instance, the second hand gesture may include the user raising their hand above where the first hand gesture was performed, or clenching their first before raising their hand in order to mirror the intuitive action of pulling an object upwards. In some embodiments, the second hand gesture creates a spline from the base position that 3D generative system 100 uses to determine the size, shape, and/or form for the 3D object of the particular tree.

In some embodiments, 3D generative system 100 defines an evolving 3D tree model for the 3D object of the particular tree. The evolving 3D tree model contains different representations of the particular tree at different states in the particular tree lifecycle (e.g., sprout, sapling, young tree, mature tree, and other states in between). In some such embodiments, 3D generative system 100 presents (at 112) a visualization in UI 101 that shows the particular tree evolving through the different defined states of the evolving 3D tree model in response to the magnitude or distance associated with the second hand gesture.

As shown in FIG. 1, 3D generative system 100 does not create a single representation of the particular tree with a fixed number of branches and leaves, and does not simply adjust the sizing of that single representation. Instead, 3D generative system 100 changes the visual elements for the 3D object of the particular tree based on the different modeled states of the particular tree within the evolving 3D tree model. Changing the visual elements includes graphically changing the shape, size, form, configuration, density, and/or other visual properties for the 3D object of the particular tree as the distance between the first and second hand gestures increases. For instance, 3D generative system 100 generates and presents (at 112) a sprout in response to the second hand gesture moving a first distance from the first hand gesture, grows the sprout to a sapling in response to the second hand gesture moving a second distance, grows the sapling into a young tree in response to the second hand gesture moving a third distance, and grows the young tree into a mature tree in response to the second hand gesture moving a fourth distance, wherein the fourth distance is greater than the third distance, the third distance is greater than the second distance, and the second distance is greater than the first distance. At each of the states defined for the evolving 3D tree model of the particular tree, 3D generative system 100 adjusts the size, length, thickness, number, coloring, and/or other visual characteristics of the tree trunk, branches, and/or leaves to emulate the growth of the particular tree during different states of its lifecycle that are cycled through by the raising of the user hand (e.g., the second hand gesture). For instance, the sprout representation may include a single shoot, the sapling representation may include a thin wooden stem with one or more leaves atop the stem, the young tree representation may include a thicker and taller wooden trunk with a first set of thin branches extending laterally from the wooden stem and with a first amount of leaves of a first size extending from the first set of thin branches, and the mature tree representation may include an even thicker and taller wooden trunk with a second set of thick branches extending laterally from the wooden trunk, a third set of thin branches extending off the second set of thick branches, and a second amount of leaves of a second size extending from the third set of thin branches.

3D generative system 100 generates and presents (at 112) the 3D tree object evolving through each of these states and additional intermediary states in response to the height of the second hand gesture increasing or the total distance spanned by the second hand gesture. Once the 3D tree object has a height, shape, size, and form of a desired modeled state, the user may halt or terminate the second hand gesture, and the 3D tree object is created and/or presented at the specified state in UI 101.

In some embodiments, the same or similar gestures may be performed with eye movements that are tracked by a one or more cameras or motion tracking sensors. For instance, eye blinks may be used to set a position at a tracked eye location for generation of a 3D object. The eye blinks may be followed by upward eye movements that grow and evolve the 3D object through various defines states.

In some embodiments, 3D generative system 100 customizes the 3D tree object in response to a third hand gesture once the desired state of the 3D tree object is defined with the second hand gesture. The customizations may include representing the particular tree with variations of the selected state for the tree.

Figure 2:
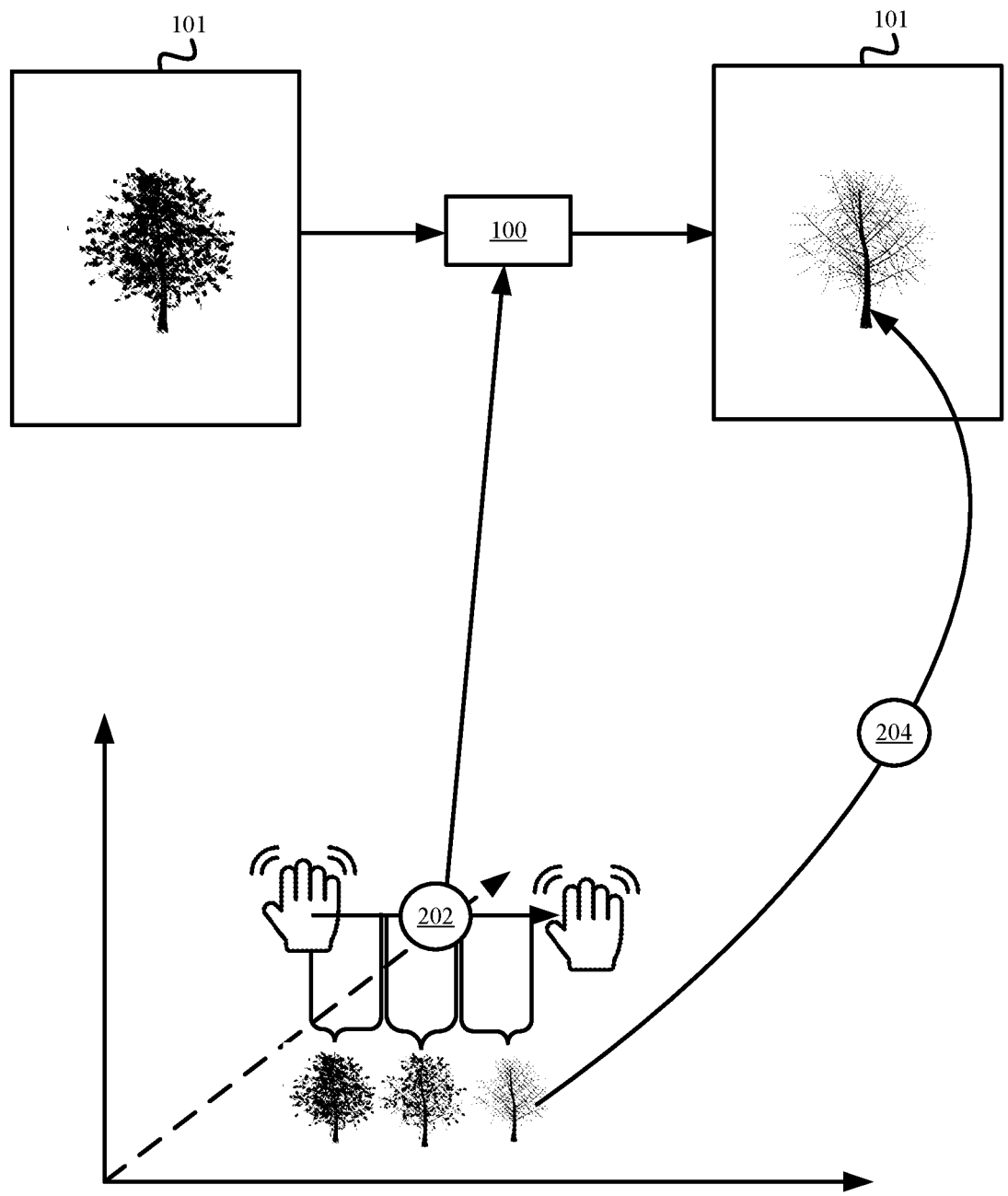
FIG. 2 illustrates an example of customizing a 3D object with different representations that are modeled for the 3D object at a particular evolved state and that are selected using hand gestures in accordance with some embodiments presented herein.

FIG. 2 illustrates an example of customizing a 3D object with different representations that are modeled for the 3D object at a particular evolved state and that are selected using hand gestures in accordance with some embodiments presented herein. FIG. 2 follows from the generation of the 3D tree object in FIG. 1. Specifically, the user performs (at 202) a third hand gesture after using the second hand gesture to set the 3D tree object at one of the several evolved states modeled for the particular tree in the evolving 3D tree model. The third hand gesture is a sideways movement of the user's hand with or without a finger pinch.

3D generative system 100 and/or the evolving 3D tree model maps the third hand gesture to a control for cycling between different modeled seasonal visualizations or representations of the particular tree in the selected evolved state, wherein a spring or summertime visualization or representation that is mapped to a leftward horizontal hand movement presents the 3D model of the particular tree with a denser first number of leaves that are a first set of colors (e.g., green) corresponding to a model of the particular tree at a particular evolved state in spring or summertime, and an autumn or winter visualization or representation that is mapped to a rightward horizontal hand movement presents the 3D model of the particular tree with the same sized trunk and the same number of branches but with a sparser second number of leaves that are a second set of colors (e.g., red, orange, and yellow) corresponding to a model of the particular tree at the particular evolved state in autumn or winter. The evolving 3D tree model may include additional in-between seasonal visualizations or representations of the particular tree that are selected based on the hand positioning in between the rightmost position associated with the spring or summertime visualization and the leftmost position associated with the autumn or winter visualization. In response to the third hand gesture being a rightward hand movement, 3D generative system 100 retains the thickness and size of the tree trunk and/or tree branches, and decreases (at 204) the density of the foliage or number of leaves on the tree branches and/or changes the coloring of the foliage to emulate the autumn or winter seasonal representation for the particular tree at the selected evolved state (e.g., as a young tree or a mature tree).

In some embodiments, the third hand gesture or a different fourth hand gesture may be used to modify the 3D tree object according to a modeled age of the tree. For instance, the size, number of branches, and/or other properties of the 3D tree object may be set with the second hand gesture, and the third hand gesture or the different fourth hand gesture may increase the density or thickness of the branches, change the bark pattern, change the branch curvature (e.g., branches become more gnarled as the tree ages), increase the branch lengths, and/or replicate other adjustments that occur naturally as a tree ages. In some such embodiments, the hand gesture for aging the 3D tree object may correspond to the intuitive rotation of the user wrist to symbolize the passage of time or the turning of a clock.

With a few simple and intuitive hand gestures, 3D generative system 100 generates a 3D object (e.g., a graphical representation of a tree) in a scene with properties and artistic effects (e.g., size, shape, form, coloring, etc.) that are customized according to user preferences. Existing generation tools would require a first input to place a predefined 3D model of the tree in a scene, and then separate inputs to change each of the customized properties. For instance, the user would enter a first value for the size of the tree, a second value for the shape of the tree, at least a third value for the number and configuration of branches, at least a fourth value for the coloring of the branches (or a separate value for varied color or coloring for each branch), at least a fifth value for the amount of foliage covering the branches (or a separate value for foliage of each branch), a sixth value for the foliage coloring, etc.

As shown in FIGS. 1 and 2, these same operations may be performed via 3 different hand gestures. In particular, 3D generative system 100 adapts the hand gestures to change different modeled states of the 3D object rather than a single customizable parameter of the 3D object. Each modeled state is defined to adjust two or more customizable parameters of the 3D objects (e.g., size, shape, density, coloring, etc.), thereby reducing the overall time and number of inputs needed to generate and customize the 3D object relative to existing generation tools that tune and customize each 3D object parameter separately. Alternatively, the gestures may be performed using eye movements and eye blink gestures that may be tracked with eye tracking cameras and/or sensors.

In some embodiments, 3D generative system 100 adapts the hand gestures to manipulate or edit the entirety of a defined 3D object or selectable parts of the defined 3D object. This allows for granular customization of a 3D object once it has been created and defined as part of a scene.

Figure 3:
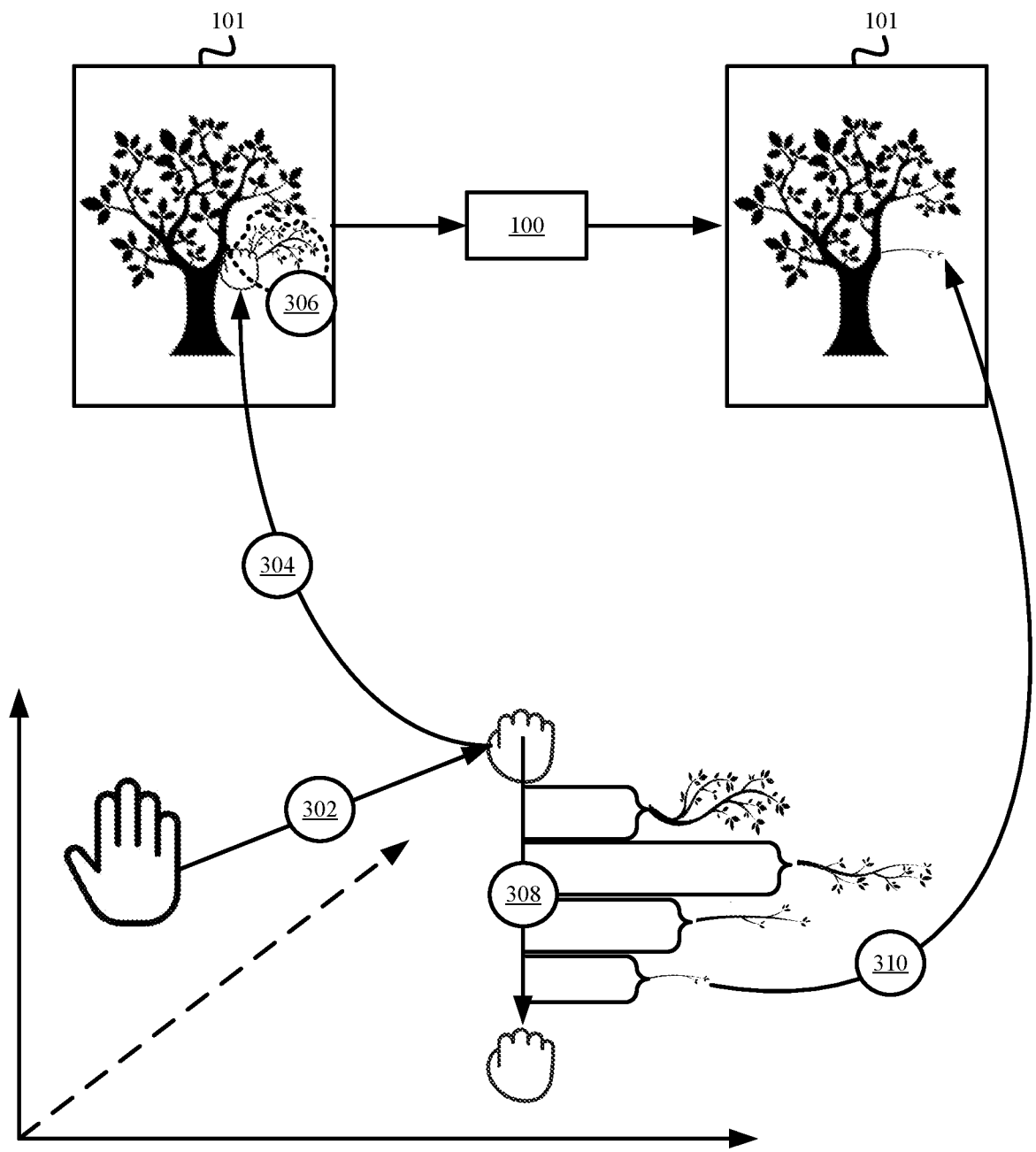
FIG. 3 illustrates an example of customizing specific parts of a 3D object using hand gestures in accordance with some embodiments presented herein.

FIG. 3 illustrates an example of customizing specific parts of a 3D object using hand gestures in accordance with some embodiments presented herein. In the example of FIG. 3, the user wishes to customize a particular branch of the 3D tree object. The user performs (at 302) a grab gesture in relation to the particular branch of the 3D tree object. Specifically, 3D generative system 100 tracks the positioning of the user hand in physical space, maps the positioning to a representation of the user hand in the virtual space of the 3D scene or environment, and determines (at 304) that the grab gesture is performed with the representation of the user hand over or adjacent to the point cloud data points, polygons, meshes, or other 3D constructs that form the particular branch of the 3D tree object.

In some embodiments, the 3D tree object is formed by hierarchically connected sets of 3D constructs that are labeled with identifiers for the different parts of the 3D tree object they represent. For instance, each set of 3D constructs representing a different branch of the 3D tree object is labeled or associated with a different branch identifier, each set of 3D constructs representing a different leaf of the 3D tree object is labeled or associated with a different leaf identifier, and the set of 3D constructs representing the tree trunk is labeled or associated with a trunk identifier. All sets of 3D constructs representing leaves of a particular branch are linked to the branch identifier or are connected to the set of 3D constructs representing that particular branch, and all branches of the 3D tree object are linked to the trunk identifier or are connected to the set of 3D constructs representing the trunk of the 3D tree object.

In response to the grab gesture being performed relative to the 3D constructs of the particular branch, 3D generative system 100 selects (at 306) the sets of 3D constructs that represent the particular branch. 3D generative system 100 also selects (at 306) other sets of 3D constructs that are hierarchically connected to the particular branch, such as the sets of 3D constructs for the twigs and foliage attached to the particular branch. Selecting (at 306) the 3D constructs includes selecting the data points, meshes, polygons, and/or other 3D constructs that are labeled with the particular branch identifier or another identifier that is hierarchically linked or connected to the particular branch identifier. Each selected 3D construct is defined with a set of positional elements (e.g., x, y, and z coordinates) for the position of the 3D construct in the virtual space of the scene or about the 3D object, and with a set of non-positional elements for the visual characteristics (e.g., color, transparency, reflectivity, etc.) of that 3D construct.

The user performs (at 308) a second hand gesture while continuing the grab gesture or while the particular branch is selected. For instance, the second hand gesture corresponds to the user moving their hand vertically with the clenched first that was used to select the particular branch. In response to the vertical movement of the hand, 3D generative system 100 increases or decreases (at 310) the length and thickness (e.g., size and form) of the particular branch, the number of twigs attached to the particular branch, and/or the number of leaves that are connected to the twigs of the particular branch. Accordingly, the second hand gesture applied to the selection of the particular branch causes only the particular branch of the 3D object tree to transition between the different evolving states that are defined for the 3D tree object. All other parts of the 3D tree object or unselected set of 3D constructs will remain at their last defined evolving state (e.g., the evolving state defined at the end of FIG. 1).

Other gestures for editing just the particular branch that is selected include freely moving the user hand with the clenched first to rotate the particular branch and reposition the particular branch as well as the foliage attached to the particular branch, rotating the user hand to apply the age effects only to the particular branch and the attached foliage (e.g., gnarling the branches, changing the texture of the bark, thickening or lengthening the particular branch, etc.), and/or moving the hand sideways to change the seasonal representation of the particular branch (e.g., transition from spring coloring to autumn coloring by changing the coloring associated with the particular branch and its connected foliage). 3D generative system 100 updates and/or tracks the different states that are defined for different parts or connected set of 3D constructs of the 3D tree object such that additional edits or manipulations applied to the entire 3D tree object or to specific selected parts of the 3D tree object are applied based on the last defined evolving state for those selected parts.

Figure 4:
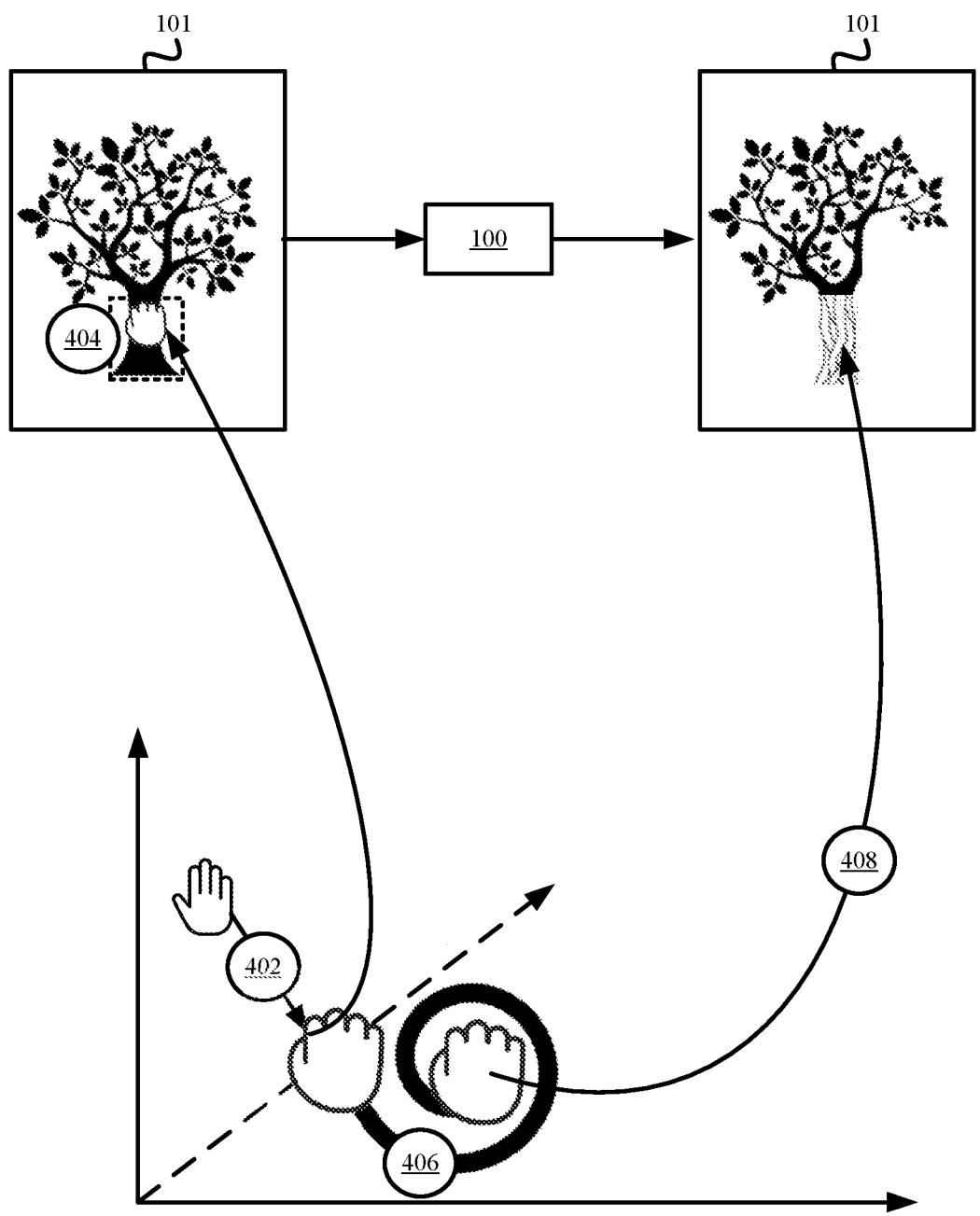
FIG. 4 illustrates an example of 3D artistic effects that are intuitively created as part of the generative drawing and customization of 3D objects using hand gestures in accordance with some embodiments presented herein.

The hand gestures, because of their 3D nature, may be used to define effects or 3D manipulations of the 3D objects that are significantly more difficult to implement or define with 2D input devices. FIG. 4 illustrates an example of 3D artistic effects that are intuitively created as part of the generative drawing and customization of 3D objects using hand gestures in accordance with some embodiments presented herein.

The user performs (at 402) a first hand gesture to select the trunk of a created 3D tree object. For instance, the user moves their hand in physical space until a representation of their hand in the 3D scene or virtual space contacts or is near the trunk, and a grab or first clench gesture is performed to signal selection of the tree trunk. 3D generative system 100 tracks the hand movements and hand gestures, and selects (at 404) the set of 3D constructs representing the tree trunk in response to the first hand gesture being performed (at 402) over one or more of the 3D constructs of the set of 3D constructs representing the tree trunk. For instance, the visual representation of the user hand is positioned over the x, y, and z positions of one or more point cloud data points, meshes, or polygons that form the tree trunk and/or are labeled with a tree trunk identifier.

The user performs (at 406) a second hand gesture to distort or deform the selected trunk of the 3D tree object. For instance, the user makes a circular or spiral movement of their hand while retaining the selection of the tree trunk with the grab or first clench gesture. 3D generative system 100 determines that the second hand gesture is associated with a distort or deform effect for the 3D tree object, and warps and/or twists (at 408) the trunk of the tree according to the second hand gesture. As shown in FIG. 4, the distort or deform effect includes curving and twisting (at 408) the set of 3D constructs associated with the trunk of the 3D tree object in the motion of the second hand gesture to give the 3D tree object a fanciful or surreal shape or form. For instance, the user may wish to create the warped 3D tree for a cartoonish 3D scene or for a fanciful world, and 3D generative system 100 generates the desired effect from a single hand gesture.

In some embodiments, 3D generative system 100 adapts the same or different hand gestures to define other 3D objects in a scene, and to perform different customizations of those objects to mirror different evolving states of the represented object. For instance, the user may select icons or UI elements in UI 101 that are associated with the generation of different 3D objects, and 3D generative system 100 automatically maps the hand gestures to the generation and customization of the selected 3D object.

Figure 5:
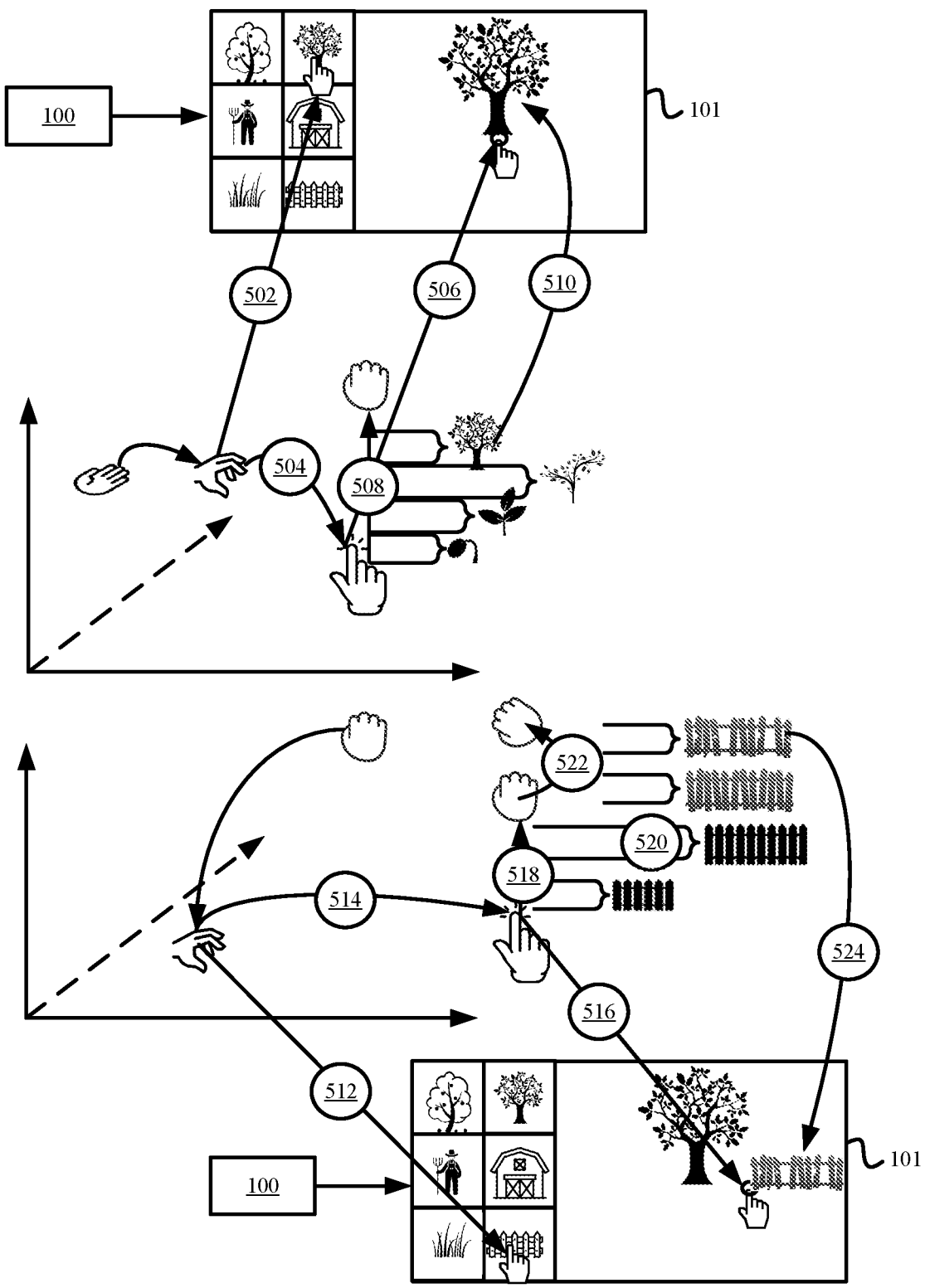
FIG. 5 illustrates using hand gestures to generate and customize different 3D objects in the same scene in accordance with some embodiments presented herein.

FIG. 5 illustrates using hand gestures to generate and customize different 3D objects in the same scene in accordance with some embodiments presented herein. The user selects (at 502) a first icon or UI element from UI 101 for the generative creation of a first 3D object (e.g., a tree). The user performs (at 504) a first gesture. 3D generative system 100 tracks and detects the positioning of the first gesture, and sets (at 506) the position of the first 3D object by mapping the tracked positioning of the first gesture from the physical space to a virtual space of the 3D scene. The user performs (at 508) a second gesture. 3D generative system 100 tracks and detects the second gesture, and transitions (at 510) the first 3D object through different modeled states until a particular state with a desired size, shape, form, and/or other properties is selected using the second gesture.

The user selects (at 512) a second icon or UI element from UI 101 for the generative creation of a second 3D object (e.g., a wooden fence). The user performs (at 514) the first gesture after selecting the second icon or UI element at a position in the physical space that sets a different base position for the second 3D object in the virtual space of the 3D scene than the first 3D object. 3D generative system 100 tracks and detects the positioning of the first gesture, and sets (at 516) the position of the second 3D object based on the mapped position of the first gesture to the virtual space of the 3D scene. The user performs (at 518) the second gesture to define the height and length of the second 3D object (e.g., the number of posts and planks of the wooden fence). 3D generative system 100 tracks and detects the second gesture, and transitions the second 3D object through different modeled states until a particular state with a desired size, shape, form, and/or other properties is selected using the second gesture. 3D generative system 100 selects (at 520) the second 3D object with the particular state to introduce into the 3D scene at the position set with the first gesture.

The user performs (at 522) a third gesture to age the second 3D object. 3D generative system 100 detects the third gesture, and transitions the second 3D object through different age representation of the second 3D object with the particular state. Specifically, the second gesture specifies a first state for a wooden fence corresponding to the shape of the fence planks, number of planks, and/or texture of the planks, and the third gesture specifies a second state for the wooden fence that changes the age of the planks which in turn changes the texture, shape, positioning, and/or number of planks to introduce increasing amounts of rot, chipping, discoloration, flaking, warping, and/or other visual characteristics associated with aging wooden fences or fences in differing levels of disrepair. 3D generative system 100 selects and presents (at 524) the selected age representation for the particular state of the second 3D object.

Additional icons of UI 101 may be used to populate the 3D scene with other 3D objects. For instance, the user may select a third icon from UI 101 to introduce grass in the 3D scene. The first gesture may be used to position the grass (e.g., specify the x, y, and z position or range of positions the grass is to cover), the second gesture may be used to change between different lengths, thickness, heights, and densities of the grass, and the third gesture may be used to change between different types of grass or drought and wet representations of the grass.

Based on the different 3D objects available within UI 101 and the evolving state customizations that are associated with each 3D object and that are implemented and controlled with a relatively small set of hand gestures, 3D generative system 100 may be used to rapidly create and populate a 3D scene with numerous individually customized 3D objects. The 3D scene may be used for storyboarding, game design, 3D image creation, animation, or creation of video content.

Figure 6:
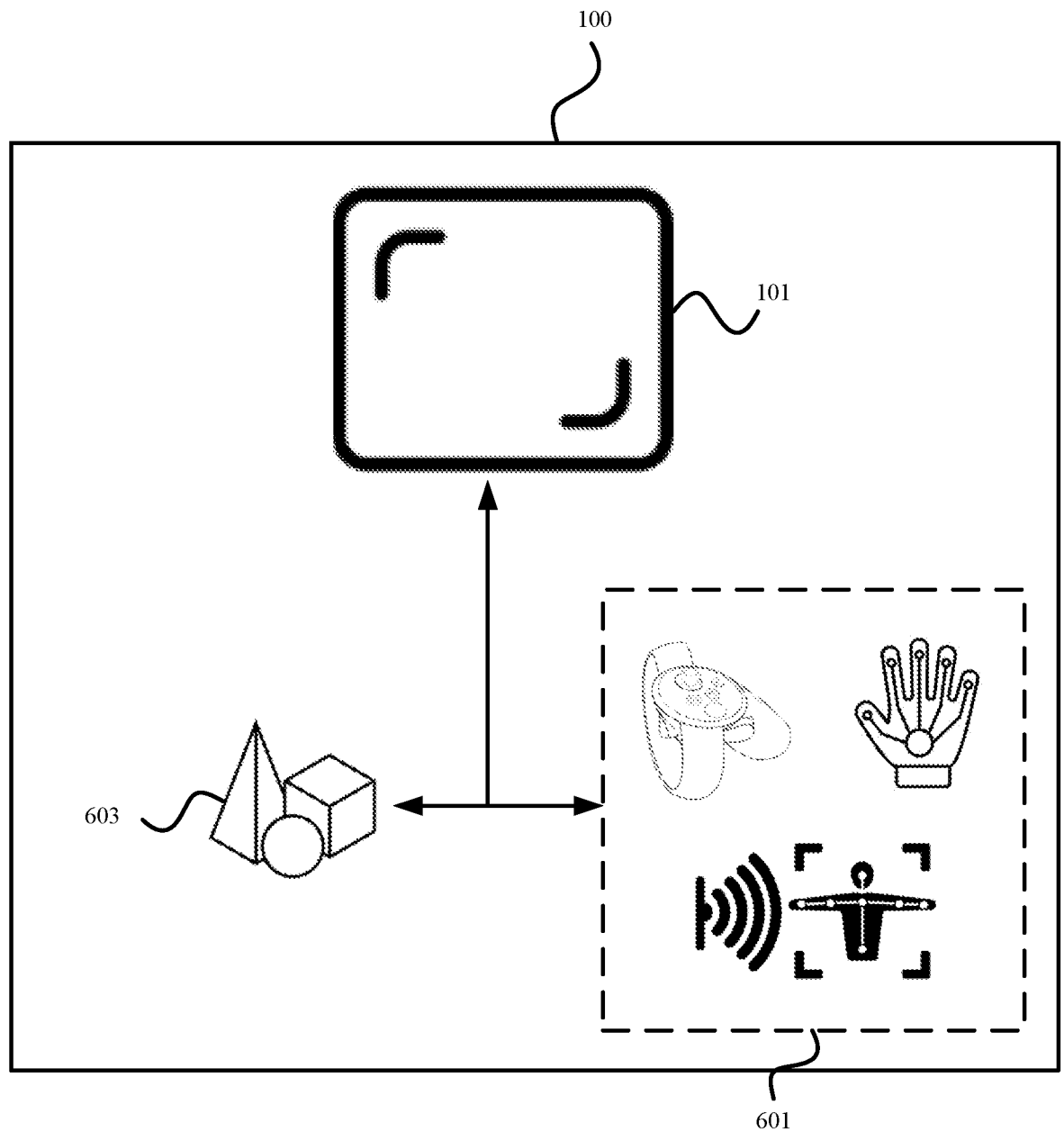
FIG. 6 illustrates an example architecture for a 3D generative system in accordance with some embodiments presented herein.

FIG. 6 illustrates an example architecture for 3D generative system 100 in accordance with some embodiments presented herein. 3D generative system 100 includes UI 101, hand gesture input controller 601, and 3D object models 603.

UI 101, hand gesture input controller 601, 3D object models 603, and/or other components of 3D generative system 100 execute on one or more devices or machines with processor, memory, storage, network, and/or other hardware resources. The one or more devices or machines may include virtual reality, mixed reality, or augmented reality headsets or wearable devices, or may include computing devices with a display that are used to generate 3D scenes or environments for games, 3D images, videos, and/or other interactive or multimedia content.

UI 101 presents the UI elements for selecting between different 3D object models 603 and/or for specifying the 3D object that is to be generated and customized in UI 101. UI 101 also renders and presents the scene or environment that is created from the generative drawing and customization of 3D object models 603. In some embodiments, the scene or environment may be stored as a single point cloud or as a single mesh or polygonal environment model. In some other embodiments, each 3D object within the scene or environment is stored as a separate point cloud or mesh or polygonal model.

Hand gesture input controller 601 tracks user hand movements and gestures, and provides the tracked movements and gestures as input to 3D generative system 100. In some embodiments, hand gesture input controller 601 includes one or more sensors that track user hand movements. For instance, the one or more sensors track the position and movement of the user hand in physical space as well as the movement of individual fingers. In some embodiments, the movements of the user hand are associated with a first set of hand gestures, the movements of the user fingers are associated with a second set of hand gestures, and the combined movements and/or configurations of the hand and fingers are associated with a third set of hand gestures. In some other embodiments, hand gesture input controller 601 receives input from a 3D input device. For instance, the 3D input device includes accelerometers, gyroscopes, magnetometers, and other motion sensors to track hand movements, and may include light sensors, cameras, buttons, or triggers to track finger movements. The 3D input device may also include a glove or other device that is worn over the user hand with sensors to track hand movements and individual finger movements.

3D models 603 contain point clouds, mesh models, or polygon models that represent different 3D objects at different states. For instance, a particular 3D model may contain a first point cloud representation of a particular type of tree as a sprout, a second point cloud representation of the particular type of tree as a sapling, a third point cloud representation of the particular type of tree as a young tree, a fourth point cloud representation of the particular type of tree as a mature tree, and other point cloud representations of the particular type of tree at other states in between. Additionally, the particular 3D model may contain additional point cloud representations for different seasonal states, of the sprout, sapling, young tree, and mature tree, for age related states, location related states, soil-condition states, etc. Another 3D model may contain different mesh models of a character at different states. For instance, the different states for the character may include mesh models of the character as a baby, toddler, child, teenager, and adult. The 3D model may contain additional mesh models or representations of the character in each of the states. For instance, the 3D model may contain representations for different health states for each evolving state. Specifically, the 3D model may contain mesh models that present the character as skinny, athletic, muscular, sick, injured, overweight, and/or other states of health in each of the baby, toddler, child, teenager, and adjust evolving states.

Accordingly, each 3D model may store multiple variations of the same 3D object with each variation being labeled to identify the represented one or more states of that 3D object. Each variation or each state representation may include a different point cloud, mesh-defined 3D object, polygon-defined 3D object, or a 3D object that is defined with other 3D constructs.

In some embodiments, 3D generative system 100 generates 3D models 603 using artificial intelligence and/or machine learning ("AI/ML"). For instance, the AI/ML may receive 3D models of an object at a start state and an end state, and one or more videos or images of the object transitioning between the start and the end state. The videos or images may be labeled to identify the different states associated with each video frame or image. The AI/ML performs comparative image analysis of the video frames or images to detect changes occurring to the object between the different states, and to modify the start and end state models to incorporate the detected changes associated with each of the different analyzed states.

In some embodiments, the AI/ML compares the received start state model and the received end state model for a particular object, defines a set of adjustments for converting from the received start state model to the received end state model, and generates different models for in-between states of the particular object by gradually increasing the amount with which each adjustment from the set of adjustments is applied in order to generate each model for the in-between states.

In some other embodiments, 3D models 603 and the different state representations of the object contained in each 3D model are generated by a graphics designer and entered into a shared database or repository. For instance, artists create and submit point clouds or 3D mesh or polygon representations of an object in different states (e.g., different lifecycle states, different time or usage conditions, etc.), and 3D generative system 100 associates the different 3D state representations of the object to a particular 3D model that is then shared or accessible by other users of 3D generative system 100.

Each of the 3D models 603 includes a rule definition. The rule definition links different hand gestures to different model adjustments, states, or state representations of the 3D model. For instance, the rule definition for the 3D model of the 3D tree object may include a first rule for growing the size of the tree object in response to the vertical hand gesture, a second rule for aging the tree object in response to a hand or wrist rotation gesture, and a third rule for transitioning the tree object between the different seasonal states in response to a sideway gesture.

To maintain the intuitive controls and simplify the generative drawing and customization of the 3D objects, the rule definitions consistently link the same gestures to the same state transitions or adjustments. For instance, the wrist rotation gesture may be linked to the aging effect (e.g., state transition) for different 3D models 603 even though the aging effect produces different adjustments depending on the modeling of the represented object in each of the different 3D models 603.

In some embodiments, each of the 3D models 603 is defined with a hierarchical structure for the different sets of points, meshes, polygons, or other 3D constructs that form the 3D model across its various states. The hierarchical structure defines linkages or connectivity between the different 3D constructs that form different parts of the 3D model across its various states. For instance, the hierarchical structure identifies the different sets of 3D constructs that form the trunk of a tree in its different states, the main branches that extend from the trunk at various states as well as the size, shape, and form of those main branches at the various states, and the twigs and foliage that grow from the main branches at the various states. The hierarchical structure may be defined by associating labels or identifiers to each 3D construct for the represented object part, and by specifying the hierarchical structure between the different labels or identifiers in the rule definition.

In some embodiments, the adjustments defined in the rule definition incorporate a configurable degree of randomness. The configurable degree of randomness creates differences or variety when the same 3D object is created in the same scene or the same adjustment is applied to different instances of the same 3D object. The incorporated randomness improves the overall artistic effect, cohesiveness, and/or realism of the created scene. For instance, the configurable degree of randomness ensures that the same identical tree is not reproduced whenever the 3D model of that tree object is selected and the same hand gesture is provided to define the tree object. The user may increase or decrease the amount of randomness that is applied to each 3D model, therefore allowing the user to create identical objects if the user chooses.

The configurable degree of randomness also applies to the 3D constructs of a generated 3D model. For instance, the configurable degree of randomness determines the likeness or difference in the pattern of twigs extending off each tree branch or the amount and distribution of foliage about each branch. Similarly, the configurable degree of randomness increases or decrease the variety in the texture of each wooden beam, post, or plank of a fence. Accordingly, the randomness that is automatically introduced by 3D generative system 100 when creating and/or customizing a 3D object may help to minimize subsequent customizations that the user performs to the created 3D object. For instance, rather than generate the same tree and have the user customize each tree to achieve a varied look, 3D generative system 100 may automatically incorporate the randomness when generating the trees so that the trees have the varied look without the user having to manually customize each tree.

Figure 7:
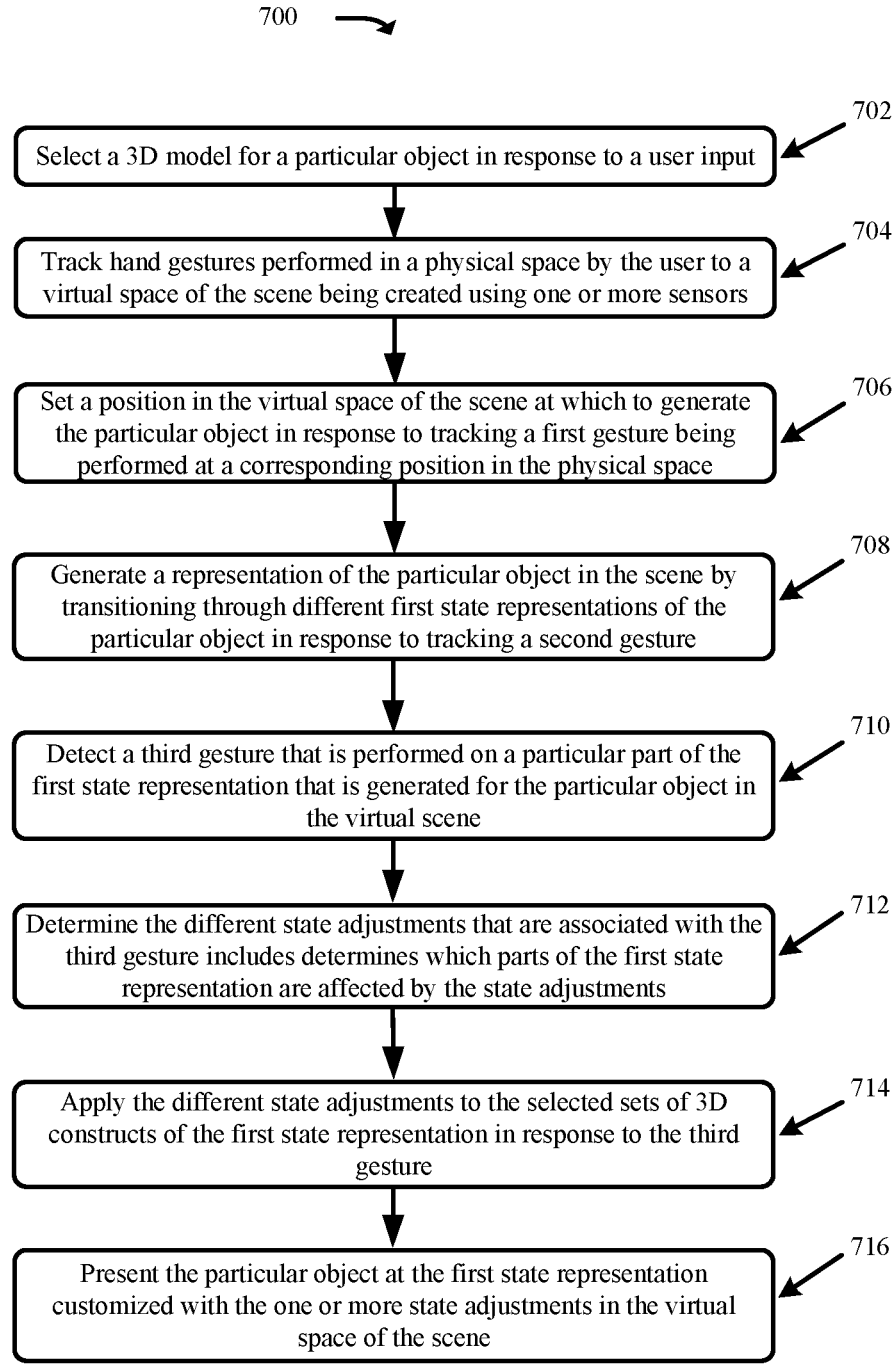
FIG. 7 presents a process for the generative drawing and customization of 3D objects based on hand gestures in accordance with some embodiments presented herein.

FIG. 7 presents a process 700 for the generative drawing and customization of 3D objects based on hand gestures in accordance with some embodiments presented herein. Process 700 is implemented by 3D generative system 100.

Process 700 includes selecting (at 702) a 3D model for a particular object in response to a user input. Specifically, the user provides input that selects the icon or UI element from UI 101 for the generative drawing of the particular object. 3D generative system 100 selects (at 702) the 3D model for the particular object from a repository storing 3D models for several different objects. The selected (at 702) 3D model defines the 3D representations for different states of the particular object, and includes the rule definition for the different state transitions and the associated adjustments that are implemented in response to different hand gestures.

Process 700 include tracking (at 704) hand gestures performed in a physical space by the user to a virtual space of the scene being created using one or more sensors. The physical space includes the real-world environment in which the user is located. The virtual space is a digital environment that contains the 3D objects created and/or customized by the user.

Process 700 includes setting (at 706) a position in the virtual space of the scene at which to generate the particular object in response to tracking a first gesture being performed at a corresponding position in the physical space. Setting (at 706) the position of the particular object includes defining the x, y, and z coordinates in the virtual space where a 3D representation of the particular object is generated and/or presented.

For simplicity, the same first gesture may be used to set the position for all 3D objects. For instance, the first gesture may include a one finger or two finger tap action.

Process 700 includes generating (at 708) a representation of the particular object in the scene by transitioning through different first state representations of the particular object in response to tracking a second gesture. The second gesture is associated in the rule definition of the selected (at 702) 3D model with the selection of the first state representations. The first state representations present the particular object in different sizes, shapes, forms, colors, densities, and/or other configurations that were modeled for the particular object in the selected (at 702) 3D model. Each of the first state representations presents the particular object at a different modeled state in its lifecycle. For a living object, the first state representations include 3D visualizations of the particular object from birth or creation to death or the end of the living object's lifecycle. For inanimate object, the first state representations include 3D visualizations of the particular object over time or its usage cycle. Once again, the same second gesture may be used to generate (at 708) the first state representation of different objects. For instance, the second gesture may include a vertical swipe gesture with or without a particular hand configuration (e.g., a fist).

Process 700 includes detecting (at 710) a third gesture that is performed on a particular part of the first state representation that is generated (at 708) for the particular object in the virtual scene. 3D generative system 100 maps the position of the third gesture in the physical space to a position in the virtual space, and determines that the position of the third gesture in the virtual space overlaps or is in range of one or more 3D constructs of the first state representation.

Process 700 includes determining (at 712) different state adjustments that are associated with the third gesture in the rule definition of the selected (at 702) 3D model for the particular object. Specifically, the rule definition associates the third gesture to a second set of state representations that are modeled for the selected first state representation in the selected (at 702) 3D model. For instance, the first state representation may represent the particular object at a specific age or configuration in its lifecycle. The second set of state representation model different changes or representations of the particular object at the specific age or configuration due to seasonality (e.g., summer, spring, winter, and fall), time-of-year (e.g., January versus June), location (e.g., mountains, cities, deserts, etc.), health (e.g., skinny, fit, muscular, overweight, etc.), states of disrepair (e.g., damaged, rotted, etc.), and/or other modeled conditions (e.g., weathered) of the particular object at the specific age or configuration represented by the first state representation.

Additionally, determining (at 712) the different state adjustments that are associated with the third gesture includes determines which parts of the first state representation are affected by the state adjustments. For instance, the rule definition may apply the different state adjustments to the entirety of the first state representation, to just the set of 3D constructs that share a common label with the one or more 3D constructs at the position where the third gesture was performed, or to a different sets of 3D constructs that are hierarchically connected to the set of 3D constructs that share the common label with the one or more 3D constructs at the particular of the third gesture.

Process 700 includes applying (at 714) the different state adjustments to the selected sets of 3D constructs of the first state representation in response to the third gesture. Applying (at 714) the different state adjustments includes modifying two or more properties of the selected sets of 3D constructs. In other words, the third gesture does not change just one properties of the first state representation, but multiple properties (e.g., size, shape, form, density, coloring, transparency, reflectivity, etc.) at the same time. Applying (at 714) the different state adjustments further include transitioning the 3D visualization of the particular object through a second set of state representations that are modeled for the particular object at the first state representation. In other words, 3D generative system 100 applies (at 714) various effects to present modeled variations of the particular object at a particular age, lifecycle state, or other state. Accordingly, in response to the third gesture, 3D generative system 100 selects the variations that were modeled for the particular object at the first state representation in the selected (at 702) 3D model and that are associated with the third gesture in the rule definition of the selected (at 702) 3D model, and 3D generative system 100 transitions the first state representation of the particular object through the modeled variations until the third gesture selects one of the modeled variations.

Process 700 includes presenting (at 716) the particular object at the first state representation customized with the one or more state adjustments in the virtual space of the scene. The user may perform additional state adjustments or customizations that are modeled for the particular object at the first state representation in the selected (at 702) 3D model using different gestures that are associated with the additional state adjustments in the rule definition. For instance, the 3D model may contain a third set of state adjustments or representations that are modeled for and that present a third set of variations of the particular object at the first state representation, and a fourth set of state adjustments or representations that are modeled for and that present a fourth set of variations of the particular object at the first state representation, and the rule definition may associate invocation of the third set of state adjustments or representations for the first state representation of the particular object to a fourth gesture and invocation of the fourth set of state adjustments or representations for the first state representation of the particular object to a fifth gesture.

Figure 8:
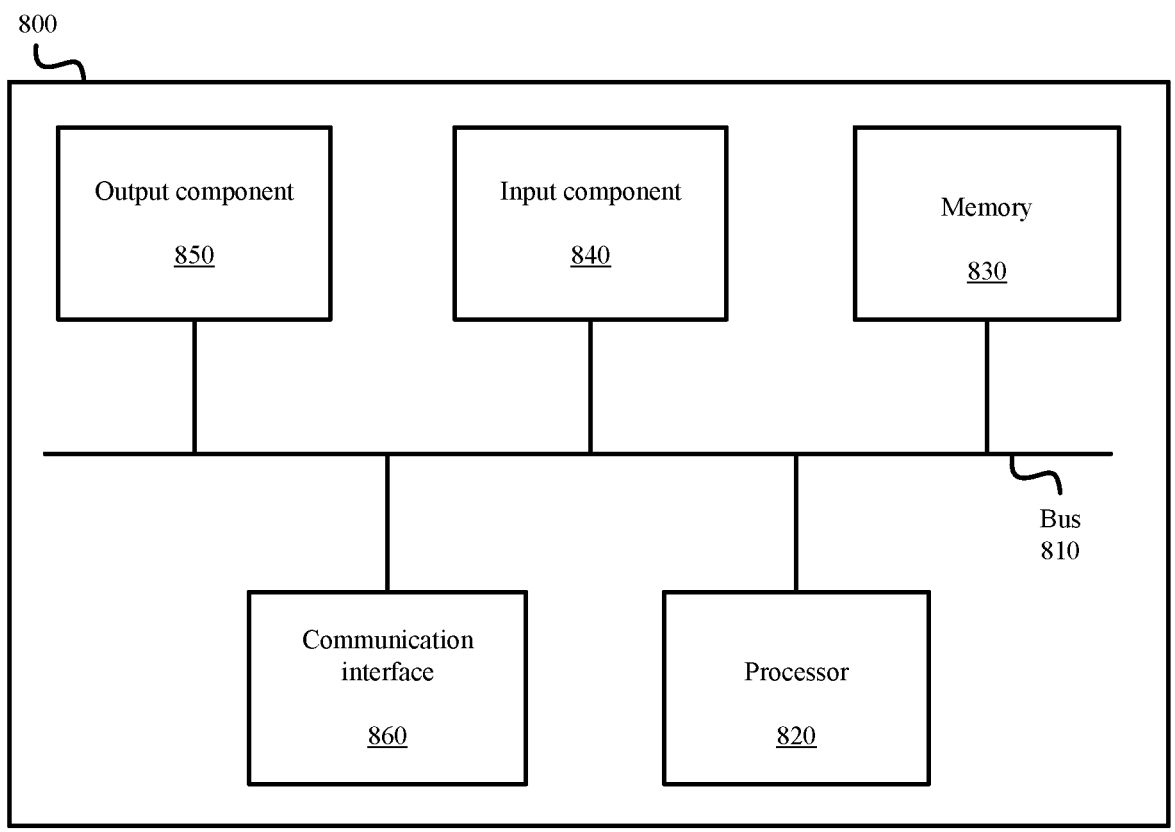
FIG. 8 illustrates example components of one or more devices, according to one or more embodiments described herein.

FIG. 8 is a diagram of example components of device 800. Device 800 may be used to implement one or more of the devices or systems described above (e.g., 3D generative system 100). Device 800 may include bus 810, processor 820, memory 830, input component 840, output component 850, and communication interface 860. In another implementation, device 800 may include additional, fewer, different, or differently arranged components.

Bus 810 may include one or more communication paths that permit communication among the components of device 800. Processor 820 may include a processor, microprocessor, or processing logic that may interpret and execute instructions. Memory 830 may include any type of dynamic storage device that may store information and instructions for execution by processor 820, and/or any type of non-volatile storage device that may store information for use by processor 820.

Input component 840 may include a mechanism that permits an operator to input information to device 800, such as a keyboard, a keypad, a button, a switch, etc. Output component 850 may include a mechanism that outputs information to the operator, such as a display, a speaker, one or more LEDs, etc.

Communication interface 860 may include any transceiver-like mechanism that enables device 800 to communicate with other devices and/or systems. For example, communication interface 860 may include an Ethernet interface, an optical interface, a coaxial interface, or the like. Communication interface 860 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 800 may include more than one communication interface 860. For instance, device 800 may include an optical interface and an Ethernet interface.

Device 800 may perform certain operations relating to one or more processes described above. Device 800 may perform these operations in response to processor 820 executing software instructions stored in a computer-readable medium, such as memory 830. A computer-readable medium may be defined as a non-transitory memory device. A memory device may include space within a single physical memory device or spread across multiple physical memory devices. The software instructions may be read into memory 830 from another computer-readable medium or from another device. The software instructions stored in memory 830 may cause processor 820 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to some of the above figures, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method comprising:
   selecting a three-dimensional ("3D") model of a particular object from a plurality of 3D models of different objects in response to a first user input, the 3D model comprising a different visual representation of the particular object in each of a plurality of states, and a plurality of variations associated with each state of the plurality of states, wherein the plurality of variations associated with a particular state of the plurality of states define different customizations for the different visual representation of the particular object in the particular state, and wherein each state of the plurality of states is mapped to a different position of a first gesture and each variation of the plurality of variations associated with each state is mapped to a different position of a second gesture;
   setting a position in a virtual space at which to generate the particular object in response to a positional input that maps to the position in the virtual space;
   selecting a first state of the plurality of states in response to the first gesture cycling through the plurality of states and stopping at a position that is mapped to the first state;
   generating the particular object at the position in the virtual space with a first visual representation that is mapped to the first state in the 3D model; and
   presenting a set of 3D constructs that form the particular object with the first visual representation in the virtual space in response to the positional input and the first gesture.

2. The method of claim 1 further comprising:
   presenting the set of 3D constructs with different customizations in response to the second gesture cycling between different variations of the plurality of variations that are associated with the first state in the 3D model, wherein the second gesture is different than the positional input and the first gesture and is of a different size, shape, and form than the different customizations that are applied to the set of 3D constructs.

3. The method of claim 1, wherein the different visual representation of the particular object in each of the plurality of states comprises a different set of 3D constructs that present the particular object at two or more of a different size, shape, form, density, color, and configuration.

4. The method of claim 1, wherein the different visual representation of the particular object in each of the plurality of states presents the particular object at a different modeled stage in a lifecycle or a usage cycle of the particular object.

5. The method of claim 1 further comprising:
   tracking hand movements of a user in a physical space; and
   detecting the first gesture in response to tracking the hand movements.

6. The method of claim 1 further comprising:
   tracking hand movements of a user in a physical space;
   mapping the hand movements to different positions in the virtual space;
   detecting the positional input in response to tracking a first set of hand movements; and
   detecting the first gesture in response to tracking a second set of hand movements.

7. The method of claim 1, wherein the plurality of states comprises an initial state with a visual representation of the particular object at birth or creation, an end state with a visual representation of the particular object at death or an end, and other states with visual representations of the particular object in between the birth or creation and the death or end.

8. The method of claim 1 further comprising:
   modifying the set of 3D constructs that form the first state of the particular object in response to the second gesture, wherein modifying the set of 3D constructs comprises changing two or more properties of the set of 3D constructs that emulate a changing appearance of the particular object at the first state.

9. The method of claim 8, wherein changing the two or more properties comprises:
   emulating a changing appearance of the particular object at the first state across different seasons based on the changing of the two or more properties.

10. The method of claim 8, wherein changing the two or more properties comprises:
    emulating a changing appearance of the particular object at the first state having different health conditions based on the changing of the two or more properties.

11. The method of claim 8, wherein changing the two or more properties comprises:
    emulating a changing appearance of the particular object at the first state across different levels of disrepair.

12. The method of claim 1 further comprising:
selecting a particular variation from the plurality of variations associated with the first state in response to the second gesture cycling between the plurality of variations associated with the first state and stopping at a position that is mapped to the particular variation; and
adjusting the set of 3D constructs with a particular customization in response to selecting the particular variation and the particular variation defining the particular customization to the different visual representation of the particular object at the first state.

13. The method of claim 1 further comprising:
selecting a second state of the plurality of states in response to the first gesture stopping at a different position that is mapped to the second state; and
presenting a second set of 3D constructs that form the particular object with the second visual representation in the virtual space in response to the first gesture stopping at the different position, wherein the first visual representation has a different size, shape, and form than the second visual representation, and wherein the first gesture is a single directional movement that does not correspond to the different size, shape, and form of either the first visual representation or the second visual representation.

14. The method of claim 1 further comprising:
receiving the second gesture after the first gesture is stopped, wherein the second gesture is different than the first gesture;
adjusting a first set of 3D constructs with a first customization in response to halting the first gesture at a first position that selects the first state and in response to the second gesture stopping at a position that is mapped to a variation of the plurality of variations associated with the first state, wherein the first set of 3D constructs presents the particular object at the first state and the variation defines the first customization comprising a first adjustment of the first set of 3D constructs; and
adjusting a second set of 3D constructs with a second customization in response to halting the first gesture at a second position that selects a second state of the plurality of states and in response to the second gesture stopping at a position that is mapped to a different variation of the plurality of variations associated with the second state, wherein the second set of 3D constructs presents the particular object at the second state and the different variation defines the second customization comprising a different second adjustment of the second set of 3D constructs than the first adjustment.

15. A computing system comprising:
one or more hardware processors configured to:
select a three-dimensional ("3D") model of a particular object from a plurality of 3D models of different objects in response to a first user input, the 3D model comprising a different visual representation of the particular object in each of a plurality of states, and a plurality of variations associated with each state of the plurality of states, wherein the plurality of variations associated with a particular state of the plurality of states define different customizations for the different visual representation of the particular object in the particular state, and wherein each state of the plurality of states is mapped to a different position of a first gesture and each variation of the plurality of variations associated with each state is mapped to a different position of a second gesture;
set a position in a virtual space at which to generate the particular object in response to a positional input that maps to the position in the virtual space;
select a first state of the plurality of states in response to the first gesture cycling through the plurality of states and stopping at a position that is mapped to the first state;
generate the particular object at the position in the virtual space with a first visual representation that is mapped to the first state in the 3D model; and
present a set of 3D constructs that form the particular object with the first visual representation in the virtual space in response to the positional input and the first gesture.

16. The computing system of claim 15, wherein the one or more hardware processors are further configured to:
present the set of 3D constructs with different customizations in response to the second gesture cycling between different variations of the plurality of variations that are associated with the first state in the 3D model, wherein the second gesture is different than the positional input and the first gesture and is of a different size, shape, and form than the different customizations that are applied to the set of 3D constructs.

17. The computing system of claim 15, wherein the different visual representation of the particular object in each of the plurality of states comprises a different set of 3D constructs that present the particular object at two or more of a different size, shape, form, density, color, and configuration.

18. The computing system of claim 15, wherein the different visual representation of the particular object in each of the plurality of states presents the particular object at a different modeled stage in a lifecycle or a usage cycle of the particular object.

19. The computing system of claim 15, wherein the one or more hardware processors are further configured to:
track hand movements of a user in a physical space; and
detect the first gesture in response to tracking the hand movements.

20. A non-transitory computer-readable medium storing program instructions that, when executed by one or more hardware processors of a computing system, cause the computing system to perform operations comprising:
selecting a three-dimensional ("3D") model of a particular object from a plurality of 3D models of different objects in response to a first user input, the 3D model comprising a different visual representation of the particular object in each of a plurality of states, and a plurality of variations associated with each state of the plurality of states, wherein the plurality of variations associated with a particular state of the plurality of states define different customizations for the different visual representation of the particular object in the particular state, and wherein each state of the plurality of states is mapped to a different position of a first gesture and each variation of the plurality of variations associated with each state is mapped to a different position of a second gesture;
setting a position in a virtual space at which to generate the particular object in response to a positional input that maps to the position in the virtual space;
selecting a first state of the plurality of states in response to the first gesture cycling through the plurality of states and stopping at a position that is mapped to the first state;

generating the particular object at the position in the virtual space with a first visual representation that is mapped to the first state in the 3D model; and presenting a set of 3D constructs that form the particular object with the first visual representation in the virtual space in response to the positional input and the first gesture.

\* \* \* \* \*